United States Patent
Chen

(10) Patent No.: US 11,757,108 B2
(45) Date of Patent: Sep. 12, 2023

(54) PRODUCTION METHOD USED FOR SINGLE CELL COMPONENTS SEALING

(71) Applicant: HYZON MOTORS INC., Honeoye Falls, NY (US)

(72) Inventor: Jie Chen, Shanghai (CN)

(73) Assignee: HYZON MOTORS INC., Honeoye Falls, NY (US)

(*) Notice: Subject to any disclaimer, the term of this patent is extended or adjusted under 35 U.S.C. 154(b) by 0 days.

(21) Appl. No.: 17/485,603

(22) Filed: Sep. 27, 2021

(65) Prior Publication Data

US 2022/0102739 A1     Mar. 31, 2022

Related U.S. Application Data

(60) Provisional application No. 63/084,146, filed on Sep. 28, 2020.

(51) Int. Cl.
*H01M 8/0273* (2016.01)
*H01M 8/0284* (2016.01)
*H01M 8/0286* (2016.01)

(52) U.S. Cl.
CPC ....... *H01M 8/0273* (2013.01); *H01M 8/0284* (2013.01); *H01M 8/0286* (2013.01)

(58) Field of Classification Search
CPC combination set(s) only.
See application file for complete search history.

(56) References Cited

U.S. PATENT DOCUMENTS

| | | | |
|---|---|---|---|
| 5,330,860 A | * | 7/1994 | Grot .................. H01M 8/1004 252/514 |
| 2004/0101735 A1 | | 5/2004 | Wells et al. |
| 2005/0181261 A1 | | 8/2005 | Yuan et al. |
| 2011/0151350 A1 | | 6/2011 | Iverson et al. |
| 2012/0034542 A1 | | 2/2012 | Martin et al. |
| 2016/0036068 A1 | * | 2/2016 | Goebel ............... H01M 8/2457 429/535 |
| 2018/0375117 A1 | | 12/2018 | Grandjean |

OTHER PUBLICATIONS

Written Opinion of the International Searching Authority dated Dec. 23, 2021.

* cited by examiner

*Primary Examiner* — Ula C Ruddock
*Assistant Examiner* — Sarika Gupta
(74) *Attorney, Agent, or Firm* — Jacob M. Ward; Ward Law Office LLC

(57) ABSTRACT

A method for sealing fuel cell components includes providing a fuel cell component and a screen printing system. A seal can be applied to a predetermined location on the fuel cell component via the screen printing system. The seal can be cured and bonded. A fuel cell can include a plurality of fuel cell components. A seal can be disposed between each of the fuel cell components. The seal is printed via a screen printing process.

19 Claims, 3 Drawing Sheets

PRODUCTION METHOD USED FOR SINGLE CELL COMPONENTS SEALING

CROSS-REFERENCE TO RELATED APPLICATIONS

This application claims the benefit of U.S. Provisional Application No. 63/084,146, filed on Sep. 28, 2020. The entire disclosure of the above application is incorporated herein by reference.

FIELD

The present technology relates to fuel cells, and more particularly, to a method of sealing fuel cell components.

INTRODUCTION

This section provides background information related to the present disclosure which is not necessarily prior art.

Fuel cell systems are currently being developed for use as power supplies in numerous applications, such as vehicles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells (PEM fuel cell) employ a membrane electrode assembly (MEA), which includes a polymer electrolyte or ion-exchange membrane disposed between the two electrodes, namely a cathode and an anode. A catalyst typically induces the desired electrochemical reactions at the electrodes. Separator plates, or flow field plates for directing the reactants across one surface of each electrode substrate, are disposed on each side of the MEA.

In operation, the output voltage of an individual fuel cell under load can be below one volt. Therefore, in order to provide a desired output voltage, multiple cells can be stacked together and connected in series to create a higher voltage fuel cell stack. End plate assemblies can be placed at each end of the stack to hold the stack together and to compress the stack components together. Compressive force can facilitate sealing and ensure adequate electrical contact between various stack components. Fuel cell stacks can then be further connected in series and/or parallel combinations to form larger arrays for delivering higher voltages and/or currents.

Certain portions of components of fuel cells and fuel cell stacks can require fluid tight seals, where sealing can be provided by various materials, including dispensing a sealant or glue at selected locations. Dispensing of sealant can be a hybrid of manual and semi-mechanical processes. Complete curing time of certain sealants (e.g., a colloid sealant) can exceed 24 hours in certain instances. Dispensing and curing of sealants can accordingly exhibit disadvantages relating to time consumption, poor consistency, and hence low efficiency. Application and shape of sealant used to form a sealed area is often not limited or tightly controlled, and certain sealants can be quite fluid and can flow, creep, and spread out on or between surfaces following application and/or compression of parts the sealant is applied thereto. After curing, sealant may also require trimming or cutting to remove excess sealant or glue. Dispensing sealant on fuel cell components accordingly requires labor and time demands that limit the mass production of fuel cells.

Accordingly, there is a continuing need for improved ways of sealing components for a fuel cell.

SUMMARY

In concordance with the instant disclosure, improved ways of sealing components for a fuel cell have surprisingly been discovered.

In one embodiment, a method for sealing fuel cell components includes providing a fuel cell component. A screen printing system can be provided. A seal can be applied to a predetermined location on the fuel cell component via the screen printing system. The seal can come into contact with another fuel cell component. The seal can be cured and bonded. In a further embodiment, a fuel cell can include a plurality of fuel cell components. A seal can be disposed between each of the fuel cell components. The seal is printed via a screen printing process.

In another embodiment, a method for manufacturing a fuel cell stack can include providing a plurality of fuel cell components. A screen printing system can be provided. Seals can be applied to a portion of the plurality of fuel cell components at predetermined locations with the screen printing system. The seals can be contacted with another portion of the plurality of the fuel cell components.

Ways of sealing fuel cell components are provided that include screen printing a sealing ring on frame of membrane electrode or bipolar plate. Examples of sealants that can be screen printed include various formulations of polymers, elastomers, and/or silicones, where such formulations can be configured to be UV and/or heat curable. Systems including screen printing sealant onto one or more components of a fuel cell and processes employing such systems are contemplated.

A seal, configured or operating as a gasket, sealing ring, or bead of material can be used to provide a fluid tight portion of a fuel cell. The present technology provides a seal on or between components of a fuel cell by screen printing a sealant or glue at a desired location. In certain embodiments, a sealant can be printed on a frame of a membrane electrode or a bipolar plate by screen printing. A sealing ring production method can directly print a sealing layer on the membrane electrode frame or the bipolar plate at the desired or required area by screen printing. By controlling the shape and the height of the screen printing plate, the required seal or sealing ring can be screen printed, which can allow the seal or sealing ring to be formed in a single print. Advantageously, the present sealing method achieves the purpose of high efficiency without the need for subsequent cutting or trimming and does not require a mold to form a seal. At the same time, screen printing is a controllable process that can achieve high consistency.

After screen printing, the printed seal can be directly bonded to various components of a fuel cell, such as a bipolar plate or membrane electrode assembly, or can be used to form a sealing ring that is then bonded to the bipolar plate or membrane electrode assembly. In certain embodiments, the seal or sealing ring can be partially or fully cured by heat and/or UV light. Direct application of the seal can allow the seal to bond to the fuel cell component. In certain applications, direct application can be combined with pressure or compression of the fuel cell component, or resulting fuel cell stack, to thereby a fluid tight sealing effect.

In contrast to dispensing sealant manually and/or mechanically, which can require considerable time and labor investment, screen printing can be performed faster and with an efficiency several times greater as an entire seal or sealing ring can be printed in one pass. What is more, the present technology can be implemented as a fully automatic operation without a need for manual trimming or post-sealing processing. Another advantage of the present technology is that screen printing can be integrated as part of a roll-to-roll production method, which can complement roll-to-roll processing of fuel cell components, such as sealing between bipolar plates and frames of membrane electrode assemblies.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of selected embodiments and not all possible implementations, and are not intended to limit the scope of the present disclosure.

Figure 5:
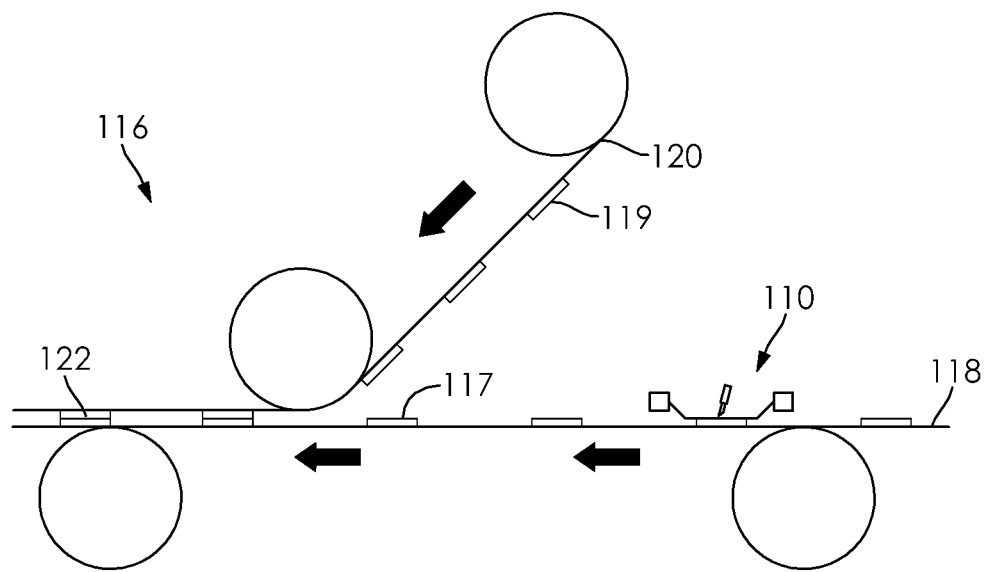
Figure 6:
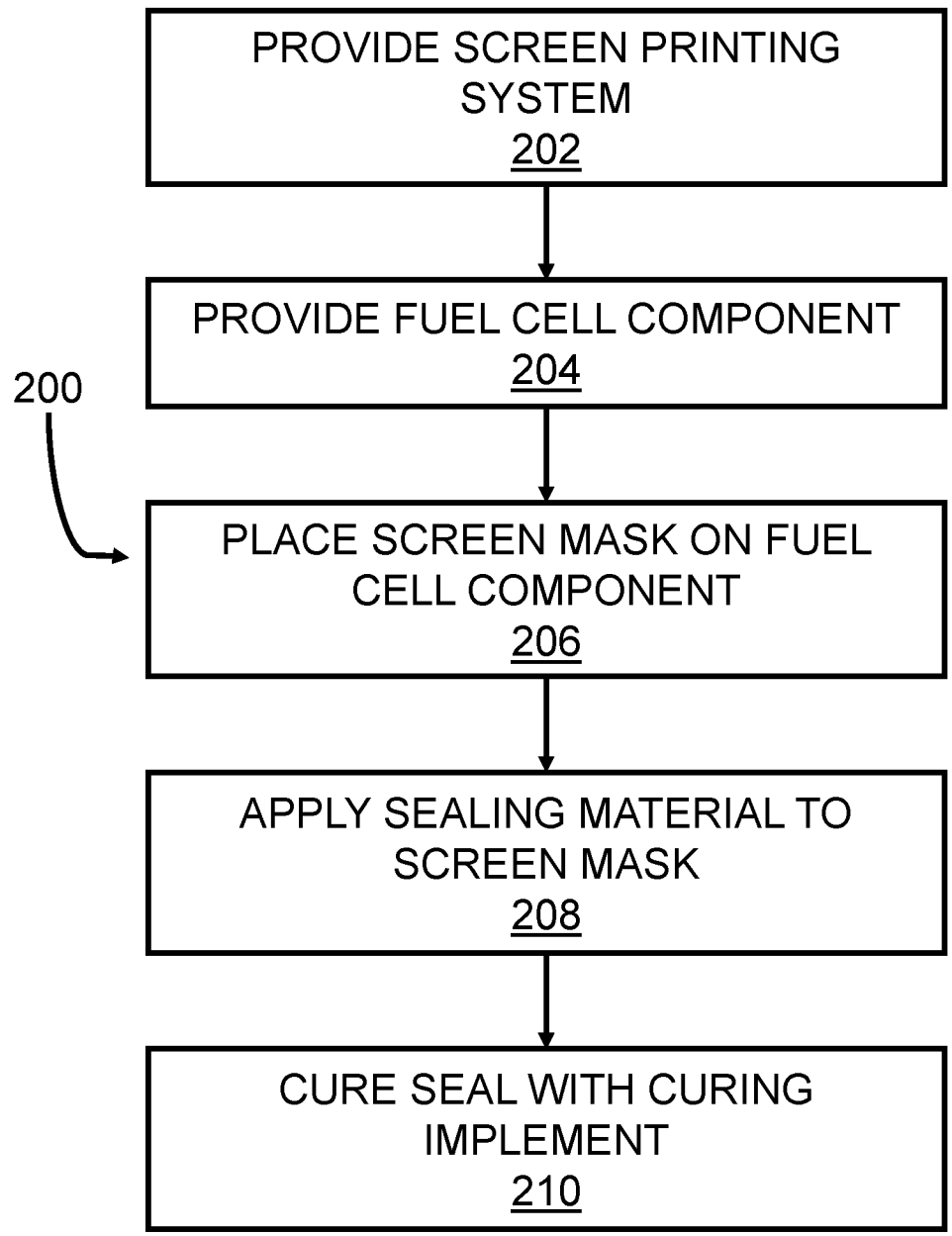

FIG. 5 is a schematic illustration depicting a provision of fuel cell components using a roll-to-roll processing system and application of seals using screen printing, according to a further embodiment of the present disclosure; and FIG. 6 is a flowchart illustrating a method of providing a seal on or between components of a fuel cell by screen printing a sealant or glue, according to one embodiment of the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
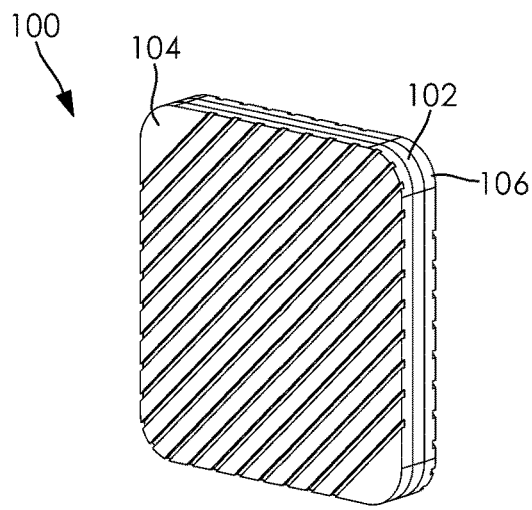
FIG. 1 is a top perspective view of a fuel cell, depicting a frame of a membrane electrode assembly affixed to a first bipolar plate with a seal and affixed to a second bipolar plate with a seal, according to one embodiment of the present disclosure.
Figure 2:
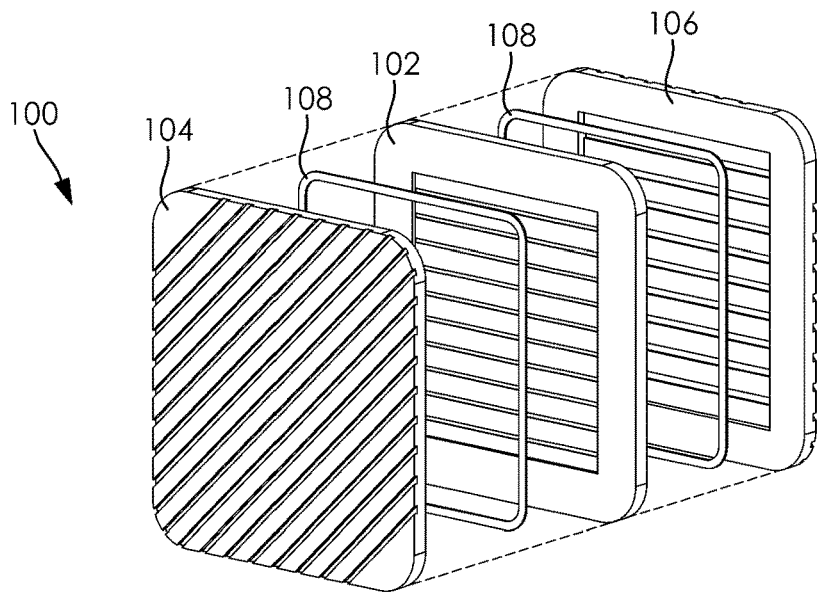
FIG. 2 is an exploded, top perspective view of the fuel cell shown in FIG. 1.
Figure 3:
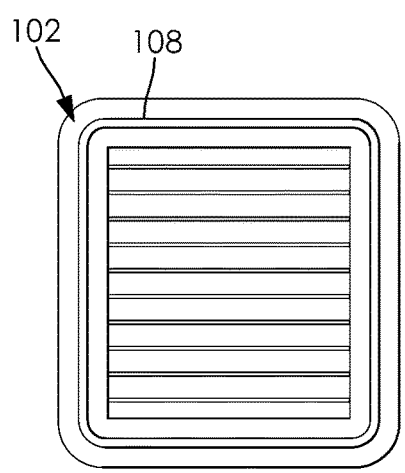
FIG. 3 is a top plan view of the frame of the membrane electrode assembly, depicted with a seal provided by a method of the present disclosure.

With reference to FIGS. 1-3, a fuel cell 100, generally, can include a membrane electrode assembly having a frame 102 disposed thereabout. The frame 102 can be disposed between various plates, including end plates and bipolar plates, where the embodiment depicted in FIG. 2 includes a first bipolar plate 104 and a second bipolar plate 106. In this way, the fuel cell 100 can be part of a fuel cell stack (not shown) including a plurality of such fuel cells 100. A seal 108 can be disposed between the first bipolar plate 104 and the frame 102 of the membrane electrode. Likewise, another seal 108 can be disposed between the second bipolar plate 106 and the frame 102 of the membrane electrode. It should be appreciated that fuel cells 100 can include additional components that can require additional seals. The present disclosure is related to the application of any required seal 108 within a fuel cell assembly or fuel cell stack on any required component, and is not limited to seals 108 between the frame 102, the first bipolar plate 104, and the second bipolar plate 106. Likewise, additional components of the fuel cell 100 and additional seals 108 can be disposed between the frame 102, the first bipolar plate 104, and the second bipolar plate 106.

The seals 108 can be configured to affix the frame 102 of the membrane electrode assembly to each of the first bipolar plate 104 and the second bipolar plate 106. Each seal 108 can be configured to operate as a gasket. Each seal 108 can provide a fluid tight connection between each of the first bipolar plate 106 and the second bipolar plate 106 to the frame 102 of the membrane electrode. In particular, each seal 108 can be a sealing ring disposed along an outer edge of the membrane electrode frame 102 or the bipolar plates 104, 106. It should be appreciated that fluid leaks can potentially lead to unused reactant fluids and reduced fuel cell 100 performance. Advantageously, the seal 108 can militate against fluid leaks between components of the fuel cell 100.

The seals 108 can be formed from a sealing material 109. The sealing material 109 can have long term chemical stability, such that the sealing material 109 will not mix or otherwise react with the chemicals used and formed within the fuel cell 100 in operation. Likewise, the sealing material 109 can be configured to not mix or otherwise react with an external environment surrounding the fuel cell 100. The sealing material 109 can have certain physical properties, such as, vibration and shock resistance, high electrical insulation properties, broad range of thermal stability over an expected temperature operation range, and ability to seal and affix the fuel cell 100 components, while also militating against the need to provide mechanical bonding between the fuel cell components themselves. Examples of sealing materials 109 can include various formulations of polymers, elastomers, silicones, and combinations thereof. The sealing material 109 can include materials that bond by solvent evaporation, that are pressure sensitive, that include contact adhesives or hot-melt adhesives, that include anaerobic adhesives or multipart adhesives, and that can be at least partially curable (e.g., using UV light and/or heat). A skilled artisan can select other suitable sealing materials 109, within the scope of the present disclosure.

Importantly, the sealing material 109 can be configured to be applied via a screen printing method 200 of the present disclosure, an embodiment of which is depicted in FIG. 5. The seal 108 can be directly printed as a sealing layer on the membrane electrode frame 102 or the bipolar plates 104, 106 at a desired or required area by screen printing. In particular, the sealing material 109 can be printed on the frame 102 of a membrane electrode or the bipolar plates 104, 106 by screen printing.

The method 200 for applying the seal 108 to a predetermined location can allow for control of the shape and height of the seal 108. By controlling the shape and the height of the screen printing plate, the required seal 108 can allow the seal or sealing ring to be formed in a single printing operation. Advantageously, the present sealing method 200 achieves the purpose of high efficiency without the need for subsequent cutting or trimming and does not require a mold to form a seal. At the same time, screen printing is a controllable process that can achieve high consistency.

Figure 4:
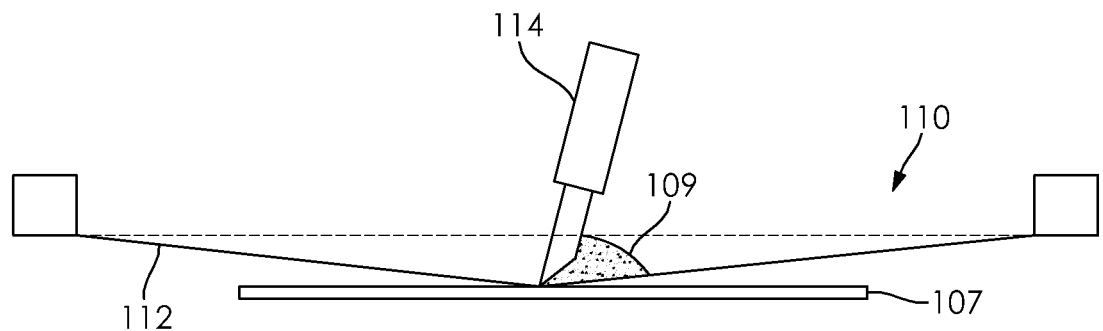
FIG. 4 is a schematic illustration depicting one way of providing a seal on or between components of a fuel cell by screen printing a sealant or glue, according to one embodiment of the present technology.

The method 200 for sealing fuel cell 100 components can include the use of a screen printing system 110, for example, as shown in FIG. 4. One example of a screen printing system 110 can include a plate or screen mask 112. The screen mask 112 can be made of a screen mesh woven with synthetic fiber such as polyester or metal fiber such as stainless steel. The screen mask 112 can include an inverse pattern of the desired seal to be formed on the fuel cell component 107; e.g., a membrane electrode frame 102 or the bipolar plates 104, 106. Accordingly, where the seal 108 is configured to be the sealing ring disposed on the outer edge of the fuel cell component 107 (e.g., membrane electrode frame 102 or the bipolar plates 104, 106), the screen mask 112 can have a pattern, which covers an area of the fuel cell component 107 and is open at the outer edge thereof. In operation, the sealing material 109 cannot pass through the pattern on the screen mask 106, and can only pass through the screen mesh of the screen mask 106 at the open outer edge. The pattern can be formed by a blocking stencil portion of the screen mask 112 that is impermeable to the sealing material 109, where open screen mesh of the screen mask 112 allows the sealing material 109 to pass therethrough to the fuel cell component 107.

As shown in FIG. 4, the fuel cell component 107 can represent a single component or multiple components. That is, for example, the fuel cell component 107 can be a single membrane electrode assembly frame 102 or multiple membrane electrode assembly frames 102. In this way, the screen printing system 110 can be used to dispose a single seal 108 onto a single fuel cell component 107 in a single pass of the screen printing system 110, or multiple seals 108 can be disposed on multiple fuel cell components 107 in a single pass of the screen printing system 110.

It should be appreciated that a height of the screen mask 112 can be adjusted to control an amount of sealing material that is transferred to the fuel cell component. Accordingly, the height of the screen mask 112 can be adjusted to control the size of the seal 108 ultimately applied to the fuel cell component 107. Various patterns can be provided using one or more screen masks 112 to provide various patterns, types, and numbers of seals 108. For example, a first seal 108 can be formed using a first screen mask 112 and a second seal 108 can be formed using a second screen mask 112, where the respective seals 108 can be formed using the same or different materials. Each resulting seal 108 can include a seal ring that has an endless structure, configured as a loop or endless pattern following or surrounding the perimeter of a portion of the component of fuel cell.

The screen printing system 110 can include a spreading implement 114. The spreading implement can be configured to apply pressure to the sealing material 109 disposed on the screen mask 112, in operation, to force the sealing material 109 through the pattern on the screen mask 106. In particular, the spreading implement 114 can configured as a squeegee or blade. The screen printing system 110 can include one or more screen masks 112 having one or more patterns thereon and can apply one or more types of sealing material 109 to one or more components of the fuel cell 100, such as the membrane electrode assembly frame 102.

As described, with reference to FIG. 4, the screen printing system 110 can be used to dispose a single seal 108 onto a single fuel cell component 107 in a single pass of the screen printing system 110, or multiple seals 108 can be disposed on multiple fuel cell components 107 in a single pass of the screen printing system 110. For example, the screen mask 112 can cover multiple fuel cell components 107, where the spreading implement 114 applies pressure to the sealing material 109 disposed on the screen mask 112 to force the sealing material 109 through the pattern on the screen mask 106 and form multiple seals 108 on multiple fuel cell components in a single pass of the spreading implement 114.

The screen printing system 110 can include a curing implement (not shown). As non-limiting examples, the curing implement can be a UV light source or a heat source employed to fabricate the seal 108. The seal 108 printed through the screen mask 112 can be directly bonded to the bipolar plates 104, 106 or membrane electrode assembly frame 102, or can be used to form a sealing ring that is then cured and bonded to the bipolar plate or membrane electrode assembly. In certain embodiments, the seal 108 or sealing ring can be cured by heating/UV and other methods by the curing implement to form the final seal 108 and provide a fluid tight sealing effect. A skilled artisan can select other suitable curing and bonding methods, as desired.

In certain embodiments, the screen printing system can be configured to mass produce seals 108 for fuel cell 100 components. The screen printing system 110 can be configured to apply seals 108 to multiple fuel cell 100 components simultaneously and automatically. Advantageously, the mass application of the seals 108 can allow for mass production of fuel cells without a labor and time investment of certain other methods of sealing fuel cells 100.

With reference to FIG. 6, the method 200 can include a first step 202 of providing the screen printing system 110, for example, as described hereinabove. A second step 204 of the method can be providing the fuel cell 100 component to receive the seal 108 (e.g. the bipolar plates 104, 106 or membrane electrode assembly frame 102). The method 200 can include a third step 206 of placing the screen mask 112 on the fuel cell 100 component. As described hereinabove, the pattern on the screen mask 112 can be particularly configured based on the fuel cell 100 component and the desired location of the seal. For example, the pattern on the screen mask 112 can be configured to apply a sealing ring around an outer edge of the frame 102 of the membrane electrode. The height of the screen mask 112 can be adjusted based on a desired size of the seal 108 to be printed on the bipolar plates 104, 106 or membrane electrode assembly frame 102. The method 200 can include a fourth step 208 of applying the sealing material to the screen mask 112, and spreading the sealing material across the screen mask 112. The sealing material can be disposed on the screen mask 112 and be evenly spread across the screen mask 112 with the spreading implement 114 across the surface of the screen mask 112. The sealing material is thereby deposited on the fuel cell 100 component at the desired location. A fifth step 210 in the method can include curing the seal 108 with the curing implement. In certain embodiments, the seal 108 or sealing ring can be cured by heating/UV and other methods by the curing implement to form the final seal 108 and provide a fluid tight sealing effect between the fuel cell 100 components.

It should be appreciated that the method 200 can be continuously performed, as desired, to provide seals 108 on fuel cell 100 components. Advantageously, the method 200 of the present disclosure can allow for mass production of fuel cell 100 seals 108. It should be further appreciated that the method 200 can be utilized to provide seals to multiple fuel cell 100 components at one time.

In certain embodiments, the method 200 can be implemented in a roll-to-roll processing system 116, for example, as shown in FIG. 5. A first fuel cell component 117 (e.g., a frame of a membrane electrode assembly 102) can be provided on a first web 118. The first web 118 can be in communication with the screen printing system 110. The first web 118 can transport the first fuel cell component 117 to the screen printing system 110, and the screen printing system can dispose the seal 108 on one or more first fuel cell components 117, as described hereinabove. The production system 116 can include a second web 120. The second web 120 can include a second fuel cell component 119. The first web 118 and the second web 120 can be configured to allow the first fuel cell component 117 having the seal and the second fuel cell component 119 to come into contact with one another to form a sealed fuel cell component 122.

In contrast to dispensing sealant manually and/or mechanically, which can require considerable time and labor investment, screen printing can be performed faster and with an efficiency several times greater as an entire seal or sealing ring can be printed in one pass. What is more, the present technology can be implemented as a fully automatic operation without a need for manual trimming or post-sealing processing. Another advantage of the present technology is that screen printing can be integrated as part of a roll-to-roll production method, which can complement roll-to-roll bonding with a bipolar plate or membrane electrode assembly in the assembly of fuel cell components, fuel cells, and fuel cell stacks.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for sealing fuel cell components, comprising:
providing a fuel cell component;
providing a screen printing system, the screen printing system configured to print multiple seals across multiple fuel cell components in a single pass;
applying a seal to a predetermined location on the fuel cell component with the screen printing system; and
contacting the seal to another fuel cell component,
wherein the fuel cell component includes one of a membrane electrode assembly frame and a bipolar plate, and the another fuel cell component includes another of the membrane electrode assembly frame and the bipolar plate.

2. The method of claim 1, wherein the seal includes a sealing ring.

3. The method of claim 1, wherein the predetermined location includes an outer edge of the fuel cell component.

4. The method of claim 1, wherein the seal is fabricated from a sealing material that is one of UV curable and heat curable.

5. The method of claim 4, further comprising curing the sealing material.

6. The method of claim 4, wherein the sealing material includes a member selected from a group consisting of a polymer, an elastomer, a silicone, and combinations thereof.

7. The method of claim 1, wherein the seal provides a fluid tight sealing effect between the fuel cell components.

8. The method of claim 1, wherein the screen printing system includes a screen mask and a spreading implement.

9. The method of claim 8, wherein applying the seal includes spreading a sealing material across the screen mask with the spreading implement.

10. The method of claim 8, wherein a height of the screen mask can be adjusted to control a height of the seal.

11. The method of claim 8, wherein the screen mask is configured to print the seal only at the predetermined location.

12. The method of claim 11, wherein the predetermined location is an outer edge of the fuel cell component.

13. The method of claim 1, wherein the applying step and the contacting step are repeated for a predetermined number of additional fuel cell components.

14. The method of claim 1, wherein the fuel cell component is provided on a roll.

15. The method of claim 1, wherein the fuel cell component includes one of a membrane electrode frame and a bipolar plate, the seal includes a sealing ring, the predetermined location includes an outer edge of the fuel cell component, the seal is fabricated from a sealing material that is one of UV curable and heat curable, and the seal provides a fluid tight sealing effect between the fuel cell components.

16. A fuel cell including a seal manufactured according to the method of claim 1.

17. A method for manufacturing a fuel cell stack, comprising:
providing a plurality of fuel cell components, wherein each of the fuel cell components includes one of a membrane electrode assembly frame and a bipolar plate;
providing a screen printing system, the screen printing system configured to print multiple seals across multiple fuel cell components in a single pass;
applying seals to a portion of the plurality of fuel cell components at predetermined locations with the screen printing system; and
contacting the seals with another portion of the plurality of the fuel cell components.

18. The method of claim 17, wherein the plurality of fuel cell components are provided on at least one web as part of a roll-to-roll processing system.

19. The method of claim 1, wherein the screen printing system is in communication with a first web and a second web, the first web configured transport the fuel cell component to the screen printing system, and the second web configured to allow the fuel cell component having the seal and the another fuel cell component to come into contact with one another to form a sealed fuel cell component.

* * * * *